United States Patent [19]
Lau et al.

[11] 3,987,282
[45] Oct. 19, 1976

[54] SHAFT POSITION CONTROLLING SYSTEM

[75] Inventors: Edward H. Lau, Old Westbury; John F. Tweedy, Jr., Bellerose Village, both of N.Y.

[73] Assignee: Redactron Corporation, Hauppauge, N.Y.

[22] Filed: Apr. 22, 1975

[21] Appl. No.: 570,507

[52] U.S. Cl. ........................ 235/151.11; 318/569; 197/18; 197/55; 318/562
[51] Int. Cl.² ............................................ B41J 23/04
[58] Field of Search ............... 318/685, 7, 8, 562, 318/569; 197/18, 55; 235/151.11

[56] References Cited
UNITED STATES PATENTS

| | | | |
|---|---|---|---|
| 3,105,927 | 10/1963 | Flatten et al. | 318/562 |
| 3,767,990 | 10/1973 | Kreithen et al. | 318/685 |
| 3,789,971 | 2/1974 | Deyesso et al. | 197/18 |
| 3,904,856 | 9/1975 | Monpetit | 235/150.21 |

Primary Examiner—Eugene G. Botz
Attorney, Agent, or Firm—Hane, Sullivan & Spiecens

[57] ABSTRACT

There is disclosed a typewriter using a single element print head wherein the tilt and rotate positions for character selection are obtained by servo systems driving tilt and rotate shafts. The system utilizes a digital multiplexing system whereby common elements in the servo channels are time shared. One common element is a binary arithmetic unit which compares binarily represented actual and desired position values of the shafts to fetch from a memory desired velocity information. The fetched velocity information in binary form is compared with the binarily represented actual velocity of the shafts to generate signals for energizing the servo motors which drive the shafts.

13 Claims, 7 Drawing Figures

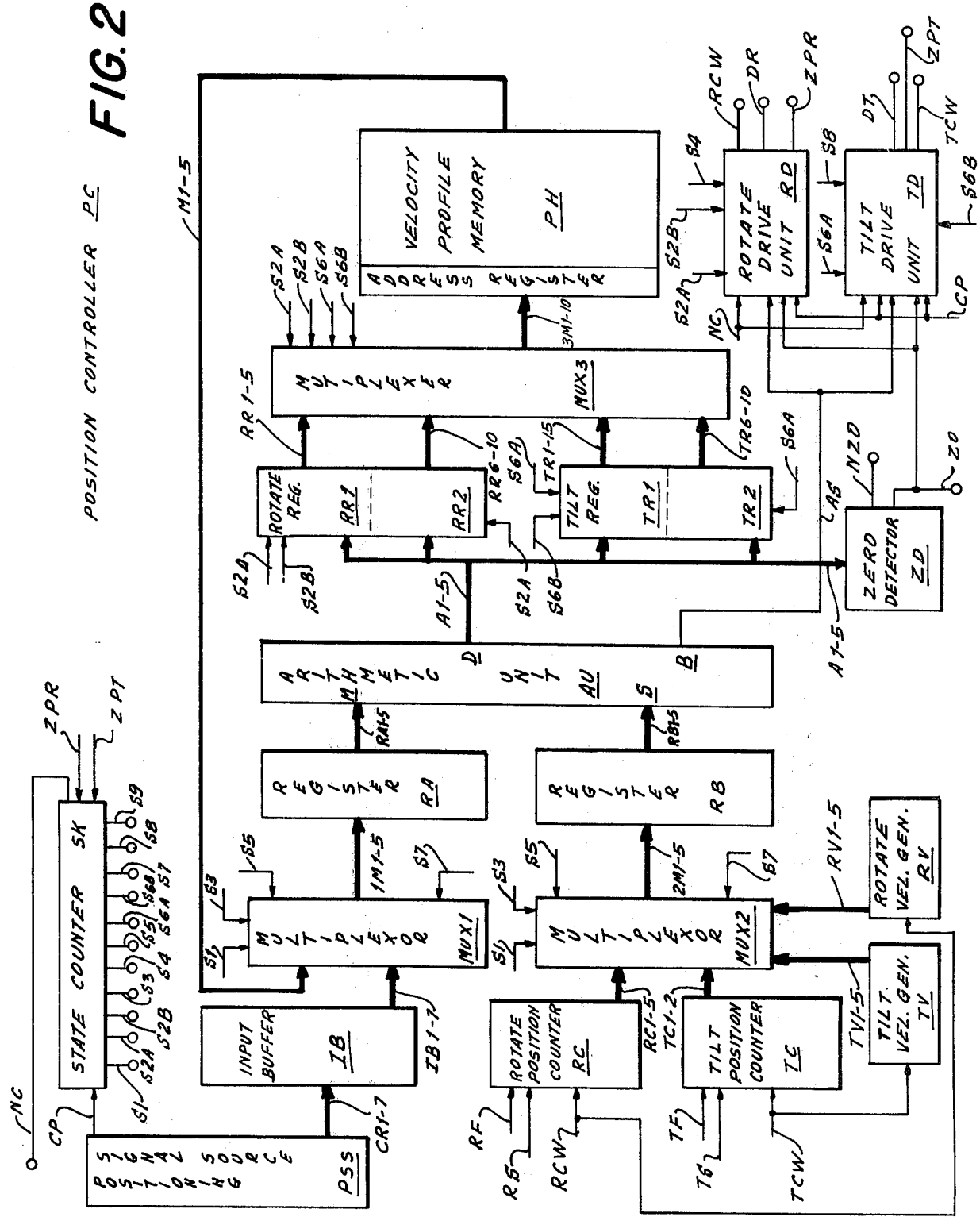

SHAFT POSITION CONTROLLING SYSTEM

This invention pertains to shaft positioning apparatus and more particularly to such apparatus which utilizes servo techniques.

The positioning of shafts is required in various automated equipment such as numerical controlled machine tools, radar directed antimissile systems, etc. Recently there have become available machines in the form of printers and typewriters utilizing single element print heads. The most common are known as SELECTRIC typewriters.

In such machines all the type characters of a font are located on the surface of one print device which may be positioned for printing engagement with a platen. Of such devices the most common and versatile is a printing head having a truncated spherical shell with characters arranged in rows and columns about the peripheral surface of the shell. A character is selected for printing by rotating and tilting the shell. In particular, there is actuated a displacement mechanism having two principal portions, one for tilting and another for rotating the shell.

In the copending U.S. Pat. application, Ser. No. 492,692, there is disclosed such a printer wherein the rotary and tilting of the shell for character selection is obtained by utilizing parallel servosystems for the shafts which are rotated to rotate and tilt the shell.

While the system described in said copending application solves many of the problems related to mechanically driven single element print heads, it created a demand for even better servo systems. For example, in each of the servo systems there are duplicate elements.

It is therefore an object of one aspect of the invention to provide servosystems which time multiplex the use of common elements while driving several servomotors simultaneously.

It is another object of the invention to provide more reliable servo controlling by utilizing digital signals as opposed to the usual analog signals utilized in servo systems.

Additionally, within a servo channel for positioning a single shaft it has been found that there are optimum velocity profiles for driving the shaft from an actual position.

It is therefore an object of another aspect of the invention to provide apparatus controlling the velocity of rotation of the shaft to follow particular profiles which are functions of the distance which the shaft must move.

It is another object of this aspect of the invention to provide apparatus for easily and reliably storing representations of such profiles as well as simple and inexpensive means for fetching such profiles as needed.

When controlling the rotation of a shaft to follow a given velocity profile it is necessary to provide instantaneous values of the actual rotational velocity of the shaft.

It is an object of a feature of the invention to provide improved apparatus for indicating in binary or digital form the instantaneous value of the rotational velocity of a shaft.

Other objects, features and advantages of the invention will be apparent from the following detailed description of the invention when read with the accompanying drawing which shows an illustrative embodiment of the invention.

In the drawings:

FIG. 2 is a block diagram of a position controller for controlling the positioning of shafts which control the rotation and tilting of the print shell in FIG. 1;

Figure 1:
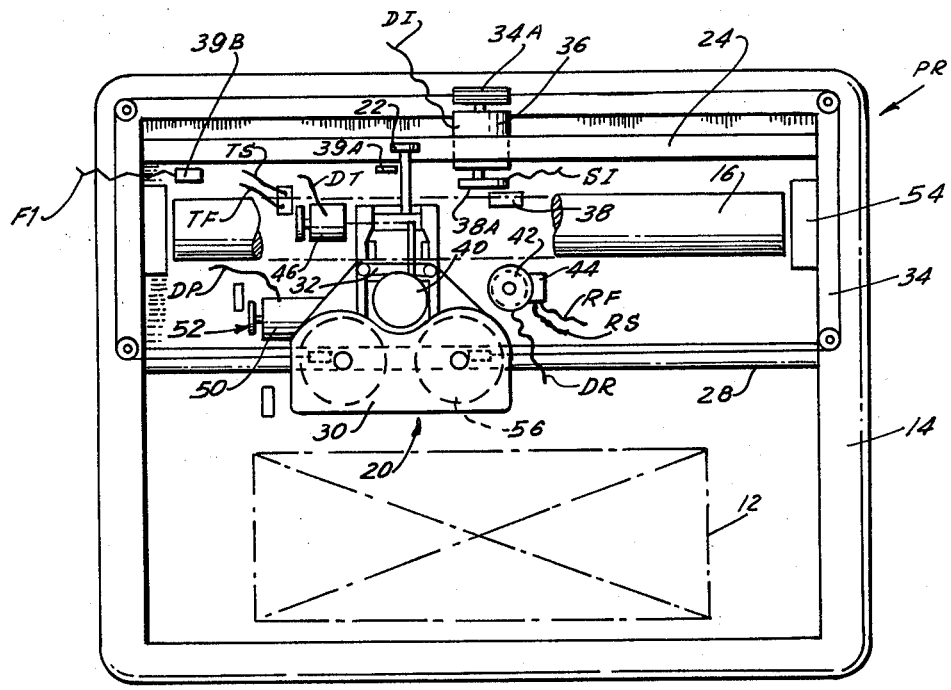
FIG. 1 is a top view of a printer utilizing the invention.

The printer PR incorporating the invention shown in FIG. 1 has a frame 14 carrying a keyboard 12 and spindling a platen 16. A print carrier assembly 20 is trunnioned at a pair of rollers 22 straddling a traverse rod 24 fixed in frame 14 and pairs of rollers 26 straddling a traverse rod 28 also fixed in frame 14.

Carrier 20 comprises a ribbon-feed 30, a print head 32 carrying a print shell 40, a tilt motor 46 and associated transducer 48, and a rotate motor 42 and associated transducer 44. Note that motor 42 and transducer 44 are connected to a shaft which rotates print shell 40 but is shown in the drawing displaced from said print head. The carrier is horizontally indexed via a cable means 34, by a motor 36. A transducer 38, on motor 36 can relay information to an index control (not shown).

In particular, when motor 36 receives signals on cable DI from the index control, the motor rotates pulley 34A causing the cable means 34 to move the carrier 20 to the left or right. At the same time, transducer 38 which can comprise a disc 38A with a band of slots, and a light source-light sensitive cell, such as a light emitting diode-photosensitive solid state device straddling the band indicated generally as combination 38B, emits a pulse on line SI each time a slot of disc 38A is operatively opposite combination 38B. In addition, carrier 20 carries a light interposer 39A which interrupts a light path established between a light source and a light sensitive cell indicated generally at 39B to cause the transmission of a pulse on line FI to the index control when the print carrier 20 is at the left hand margin. Since the indexing per se forms no part of the invention it will not be further described. The single element print head 32 has a print shell 40 upon the partially spherical surface on which are disposed, by way of example, four rows of 22 type characters. At any given time one of these type characters occupies a print position, i.e., is directly opposite platen 16 so that when the print shell 40 is driven against the record medium carrying platen 16, the desired character is printed on the record medium. Each type character on the print shell can be represented by a two-quantity address relative to this print position or another fixed position. In particular, each type character is given an address having a first part indicating the row containing the character and a second part indicating its position within the row. The print shell 40 is connected via a shaft to the bidirectional motor 42 which rotates in the print shell in a clockwise or counter-clockwise direction as viewed in FIG. 1 to present different type characters within a row for printing when receiving signals via cable DR from a position controller hereinafter more fully described. In addition, coupled to the shaft is a transducer array 44 which emits pulses on line RS for each one-eighth of a character increment rotation of the shaft and a pulse on line RF when at the home position. The transducer 44 can be a disc with one band of 176 equispaced slots and a second band with a single slot, and a pair of light source-light sensitive cells each operative opposite one of the bands. The print shell 40 is so connected via a linkage to another motor 46 of the same type as mentioned above which rotates when receiving signals on line DT from the position controller to tilt the shell for making available different rows of type characters for printing. Similarly, this motor is connected to transducer array 48 which emit pulses on lines TF and TS representing respectively the fiducial point (or home position) and each row increment of tilt. Array 48 is similar to array 44 except the one band only has thirty two instead of 176 slots.

The print shell 40 is carried on the print head 32 or rocker which is driven toward the platen 16 to print the available character of the print shell. This is accomplished by mechanisms driven during the single revolution of a motor 50 in response to signals on line DP from a print control not shown.

In general, when a character is to be printed the index control, the print control, and the position controller receive signals representing binary numbers. The binary numbers received by the position controller immediately initiate rotation and tilting of the print shell 40 to move the selected type character to the print position by feeding signals on lines DR and DT to the respective drive motors. During the movement, unit changing pulses are fed via lines TS and RS to the position controller. When both the desired rotational position and the tilt position of the shell are being reached the print control is activated and starts emitting signals on line DP to motor 50 for a single revolution. Somewhere during the revolution the actual driving of the print rocker toward the platen begins and and the print shell on the rocker flies toward the platen. The instant the head contact (print) portion of the cycle is over, the carrier 20 can be indexed and a new character can be called for. Sometimes thereafter there is a call for the next character and signalling to the index control to perform the horizontal indexing. The index control emits signals on line DI to drive the motor 36. As the motor 36 rotates to perform the indexing, index increment pulses are fed back on line SI to indicate the moving of the carrier. This continues until the new horizontal position is reached. This sequence is performed for each character to be printed.

The position controller PC which controls the positioning of the rotate and tilt shafts for selecting the character on the print shell 40 for printing is shown in FIG. 2.

The position controller PC comprising a positioning signal source PSS which can be a seven bit flip-flop register receives from a character source (not shown) two binary numbers in parallel, the first number is a two bit number representing one of the four possible tilt positions of the print shell, the second number is a five bit number representing one of the 22 possible rotary positions of the print shell; an input buffer IB, a seven bit flip-flop register, receives, via the seven lines of cable CR1-7, the two binary words stored in source PSS, and stores these words; a rotate position counter RC (which can be a conventional up-down counter) for counting pulses received on line RS from the rotate shaft transducer, the counter will down count unless it receives a signal on line RCW and will then up count, the counter is initialized whenever it receives a pulse on line RF; a tilt position counter TC (which can be a conventional up-down counter) for counting pulses received on line TS from the tilt shaft transducer, the counter will down count unless it receives a signal on line TCW and will up count in response thereto, the counter is initialized whenever it receives a pulse on line TF; the multiplex MUX1 is a logic array, hereinafter more fully described, which selects when the seven lines of cable IB1-7 from input buffer IB and the five lines of cable M1-5 from velocity profile memory PM are connected to the five lines of cable 1M1-5; similarly multiplexer MUX2, hereinafter more fully described, is a logic array which selects when the five lines of cable RC1-5 from rotate position counter RC, the two lines of cable TC1-2 from the tilt position counter TC, the five lines of cable RV1-5 of rotate velocity generator RV are connected to the five lines of cable 2M1-5; register RA, a five stage flip-flop register for receiving and storing binary numbers from cable 1M1-5; register RB, a five stage flip-flop register for receiving and storing binary numbers from lines 2M1-5; a rotate velocity generator Rv, hereinafter more fully described, for generating a binary number representing the instantaneous velocity of the rotate shaft in resonse to pulses received on line RS; a tilt velocity generator TV (hereinafter more fully described) for generating a binary number representing the instantaneous velocity of the tilt shaft in response to pulses received on line TS; an arithmetic unit AU which can be a five place parallel fully binary subtractor having a minuend input M for receiving a binary number via the five lines of cable RA1-5, from register RA, a subtrachend input S for receiving a binary number bia the five lines of cable RB1-5, from register RB, a difference output D for transferring to lines A1-5 the binary number resulting from the subtraction of the number at substrachend input S from the number at minuend input M, and sign output B connected to line AS; a rotate register RR, which can be two five-bit flip-flop registers for generating addresses of storage registers are connected in parallel to lines A1-5; a tilt register TR, which can be two five-bit flip-flop registers which are connected in parallel to lines A1-5 to generate addresses for storage registers; a multiplexor MUX3 for controllably connecting the five lines of cable RR1-5 and the five lines of cable RR6-10 or the five lines of cable TR-5 and the five lines of dable TR6-10 to the ten lines of cable EM1-10; a velocity profile memory PM, which can be a programmed read only memory (PROM), for storing velocity profile information which is fed as binary numbers on lines M1-5 in response to addresses received on line 3M1-10; a zero detector ZD, which can be a five input gate connected to the cable A1-5 to decode when the number stored therein is zero; a rotate drive input RD hereinafter more fully described, which feeds drive signals on cable DR to energize the rotate motor 42; a tilt drive unit TP, hereinafter more fully described, which feeds drive signals on cable DT to tilt motor 46; and a state counter SK, hereinafter more fully described, which sequences the controller PC through operating routines.

Before going into a detailed description of the operation of program controller PC, it may be instructive to get an overview of the operation. In general, when a new character is called there is performed a rotating and a tilting sequence. Each sequence performs the same set of operations and the operations of one set are interleaved, i.e., with the operations of the other set, step 1 for rotate is performed, then the corresonding operation step 1 for tilt is performed, then operation step 2 for rotate is performed, then the corresponding operation step 2 for tilt is performed, etc. This interleaving concept is intimately tied to the multiplexing concepts of the invention. Since both sets of operations are generally the same only that for rotate will be discussed for the present.

Figure 7:
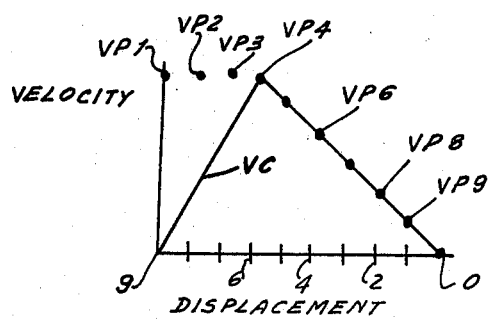
FIG. 7 shows a graph representing a typical velocity profile.

In particular, the binary number representing the desired rotate postion is compared with the binary number representing the initial actual rotate position of the print shell. Actually the latter is subtracted from the former by the arithmetic unit AU which produces a difference number and a sign. The sign is used to determine the direction in which the print shell is to rotate. The number per se is used to select a velocity profile information. A velocity profile is basically a set of instantaneous velocity values which the shaft should have at each incremental position during its rotation from the actual to the desired rotate position to insure that the time for the complete rotation is at an optimized minimum taking into account motor size, possible overshot, braking, etc. In general, one desires that the motor be accelerated to a maximum velocity in the shortest possible time and then kept at that velocity until the desired position is reached. However, because of inertia and other considerations, profiles such as that shown in FIG. 7 are used. The profile is representative and is specifically related to an initial difference of nine increments between the initial actual rotate position and the desired rotate position. (Thus, for the present example there would be twenty one such profiles.) The solid line VC in FIG. 7 represents the desired velocity as the distance between the actual and the desired rotate positions decreases from nine increments to no increments. Since the actual velocity will be sampled at discrete points in the travel, the points VP1 to VP9 are related to desired velocity values for each of the discrete points. The discrete points have been chosen to occur for each character position in a row of the print shell. The desired velocity value at each one of the points VP is represented as a binary number and is stored in a set of registers of the velocity profile memory PM. Thus there are 21 sets of registers for the rotate velocity profiles. Each set is characterized by the difference between the initial actual rotate position and the desired rotate position.

As a result of the first comparison the set of registers containing the related volocity profile is chosen and more particularly within that set the register containing the first desired velocity value, e.g., value VP1 of FIG. 7. This desired value is compared with the actual velocity value of the shaft at the time. In particular, the actual desired velocity value as a binary number is subtracted from the desired velocity value in the arithmetic unit AU. The sign of this difference is used to instruct the rotate motor to accelerate or decelerate. The cycle now repeats. In particular, the desired position value is compared to the next actual position value reached by the shaft. The difference is used to select the next register of the chosen set. The desired velocity value in that next register is compared with the new actual velocity value to again control the motor to accelerate or decelerate. Note again that the multiplexing also covers the comparing of the position and velocity values during each sequence. These cycles continue until the difference in positions is shown to be zero at which time the motor which has been slowing down is stopped. When both the displacement and the velocity are zero this fact is stored. When the tilt sequence, which it will be recalled is interleaved herewith, also reaches this point it also stores this fact. When both routines have reached this point the system is instructed to print the character and fetch a new character.

The operation of program controller PC will be described in conjunction with a series of states of the state counter SK.

In state zero the counter SK and the controller are quiescent and awaiting the receipt of a character. When a character is received the rotate and tilt binary words associated with that character are fed from positioning signal source PSS to input buffer IB, while at the same time a start signal is fed via line CP to step the state counter SK to state 1 indicated by a signal on line S1. Periodically thereafter, counter SK will step to successive states at fixed time intervals. In addition, the pulse on line CP unlocks rotate drive unit RD and tilt drive unit TD.

In state 1 the signal on line S1 causes multiplexor MX1 to transfer the desired rotate value from input buffer IB to register RA and multiplexor MX2 to transfer the initial actual rotate value from rotate position counter RC to register RB. Arithmetic unit AU subtracts the contents of register RB (the actual rotate position value) from the contents of register RA (the desired rotate position value). The numeric difference is present on the lines of cable A1-5 and the sign of the difference is present on line AS. The state counter now steps to state 2 for the first time as indicated by a signal on line S2A. Note each succeeding time the counter SK is stepped to state 2 during the processing of this character there will be a signal on line S2B instead of line S2A. In response to the signal on line S2A the number on cable A1-5 is loaded into both five-bit registers RR1 and RR2 of rotate register RR. For subsequent occurrences of state 2 the signal on line S2B will permit the changing of the contents of register RR1. Thus the set of registers containing the desired velocity profile is obtained by virtue of the value stored in register RR1 with the registers of the set effectively being chosen by virtue of the value stored in register RR2. The signal on line S2A at this state 2 time and the signal on line S2B for subsequent occurrences of state 2 will feed the contents of rotate register RR as a ten bit address to velocity profile memory PM which will transmit an instantaeneous desired velocity value onto the lines of cable M1-5. In addition, the signal on line S2A causes rotate drive unit RD to sample the sign on line AS. If the sign is positive the rotate shaft must be rotated in one direction, say clockwise as indicated by a signal on line RCW; if the sign is negative the shaft must be rotated in the counterclockwise direction. The presence of a signal on line RCW also controls the rotate position counter RC to count up since the shaft will be rotating in the clockwise direction.

The state counter SK now steps to state 3 as indicated by a signal on line S3. The signal on line S3 causes multiplexor MUX1 to connect the lines of cable M1-5 to the stages of register RA thus loading the desired velocity value therein, and causes multiplexor MUX2 to connect the lines of cable RV1-5 to the stages of register RB thus loading the present velocity value therein. Arithmetic unit AU now subtracts the desired velocity value from the actual velocity value and presents the sign of the calculation on line AS. The step counter SK now steps to step 4 as indicated by a signal on line S4. The signal on line S4 causes the rotate drive unit RD to accept the sign information on line AS and use it along with the sign information received in step 2 to accelerate or decelerate the motor. In addition rotate drive unit RD samples the signal on line ZO to determine whether the desired and actual velocities are equal and if so to let the motor coast regardless of the signal on line AS. The state counter SK now steps to state S5.

In state 5 the signal on line S5 causes multiplexor MX1 to transfer the desired tilt value from input buffer IB to register RA and multiplexor MX2 to transfer the initial actual tilt value from tilt position counter TC to register RB. ARithmetic Unit AU subtracts the contents of register RB (the actual tilt position value) from the contents of register RA (the desired tilt position value). The numeric difference is present on the lines of cable A1-5 and the sign of the difference is present on line AS. The state counter now steps to state 6 for the first time as indicated by a signal on line S6A. Note each succeeding time the counter SK is stepped the state 6 during the processing of this character there will be a signal on line S6B instead of line S6A.

In response to the signal on line S6A the number on cable A1-5 is loaded into both five-bit registers TR1 and TR2 of tilt register RR. For subsequent occurrences of state 6 the signal on line S6B will permit the changing of the contents of register TR1. Thus the set of registers containing the desired velocity profile is obtained by virtue of the value stored in register TR1 with the registers of the set effectively being chosen by virtue of the value stored in register TR2. The signal on line S6A at this state 6 time and the signal on line S6B for each subsequent state 6 will feed the contents of tilt register TR as a ten-bit address to velocity profile memory PM which will transmit an instantaneous desired velocity value onto the lines of cable M1-5. In addition the signal on line S6A causes tilt drive unit TD to sample the sign on line AS. If the sign is positive the tilt shaft must be rotated say clockwise as indicated by a signal on line TCW; if the sign is negative the shaft must be rotated in the counterclockwise direction. The presence of a signal on line TCW controls the tilt position counter TC to count up since the shaft will be rotating in the clockwise direction.

The state counter SK now steps to state 7 as indicated by a signal on line S7. The signal on line S7 causes multiplexor MUX1 to connect the lines of cable M1-5 to the stages of registor RA thus loading the desired velocity value therein, and causes multiplexor MUX2 to connect the lines of cable TV1-5 to the stages of register RB thus loading the present velocity value therein. Arithemetic unit AU now substracts the desired velocity value from the actual velocity value and presents the sign of the calculation on line AS. The step counter SK now steps to step 8 as indicated by a signal on line S8. The signal on line S8 causes the tilt drive unit TD to accept the sign information on line AS and use it along with the sign information received in step 6 to accelerate or decelerate the motor. In addition the unit TD samples line ZO to determine whether the actual velocity is the same as the desired and if so to let the motor coast.

The state counter SK now steps to state 9. A test is performed in state counter SK. If the position differences for both the tilt and rotate routines are indicated as zero the character is effectively attaining final positioning and state register SK shortly thereafter emits a signal on line NC to tell the system to print the character and present a new character. Otherwise the counter reverts to step 1 and repeats the cycle.

Figure 3:
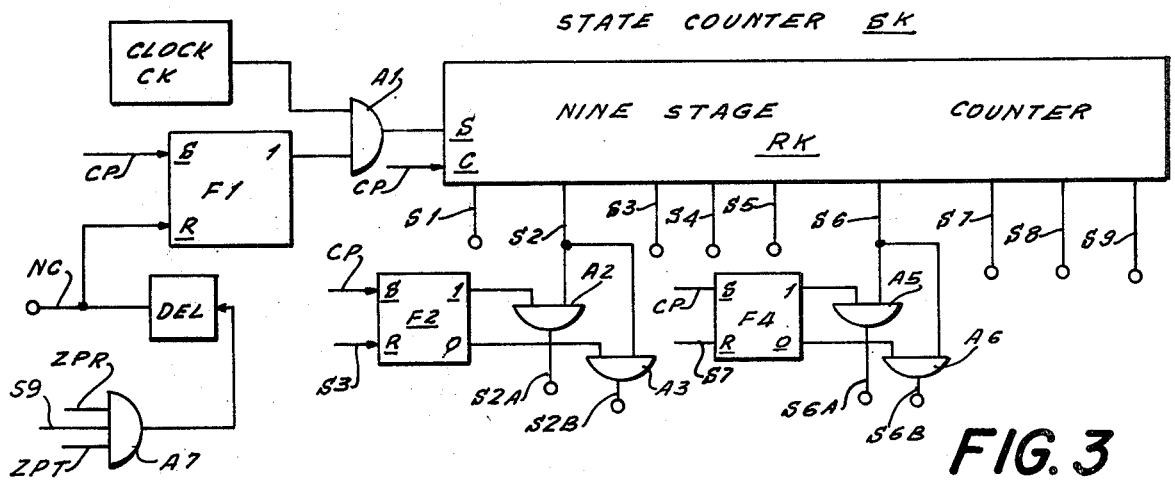
FIG. 3 is a logic diagram of the state counter shown in FIG. 2.

State counter SK is shown in FIG. 3 centering around two circuits: the nine stage counter RK which is initialized from a state 0 to a first state 1 in response to a pulse at its clear input C from CP and is thereafter stepped in ring counter fashion by stepping pulses received at its step input S from clock CK under the control of AND-gate A1 whose second input is connected to the 1-output of set-reset flip-flop F-1. The flip-flop is set by a pulse received at input S from line CP and restored by a pulse received at input R from line NC. When the counter is cycling it transmits pulses successively on the nine outputs S1 to S9. Note, however, output S2 of counter RK is connected to first inputs of AND-gates A2 and A3 whose second inputs are connected respectively to the output-1 and output-0 of set-reset flip-flop F2, the set and restore inputs S and R of which are connected respectively to lines CP and S3. Thus the first time during the character processing that the signal occurs on line S2 it is transmitted from state counter SK as a signal on line S2A and for each succeeding time during the same character processing it is transmitted on line S2B. In a similar manner the signal on line S6 is transposed to signals on lines S6A and S6B by AND-gates A5 and A6 controlled by flip-flop F4.

When the counter SK is in step 9 the signal on line S9 samples AND-gate A7 whose other inputs are connected to lines ZPR and ZPT if both the rotate and tilt movements have reached to within the range of the desired positions the gate emits a pulse which triggers a delay circuit DEL. After a period of time which allows for final homing of the print shell 40, the delay circuit DEL emits a pulse on line NC.

Figure 4:
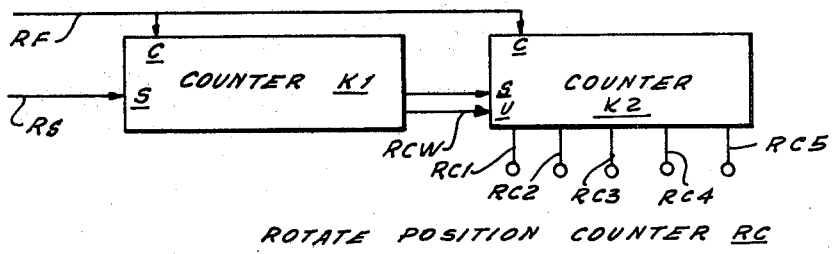
FIG. 4 is a logic diagram of the rotate position counter in FIG. 2.

Rotate position counter RC shown in FIG. 4 comprises a module-8 counter K1 in cascade with up-down counter K2. Thus for each of the eight pulses received at its count inputs via line RS from the transducer 44 (FIG. 1) counter K1 emits a pulse to the count input S of counter K2. Counter K2 with either increment or decrement in response to such received pulse depending on whether a signal is present or not on line RCW connected to its up/down input U. The clear inputs C of both counters are connected to line RF for registering the home position of the shaft to the home positions of the counters.

The tilt position counter TC is similar to rotate position counter RC except that the equivalent counter K2 need only be two stages instead of five since there are only four tilt positions.

Figure 5:
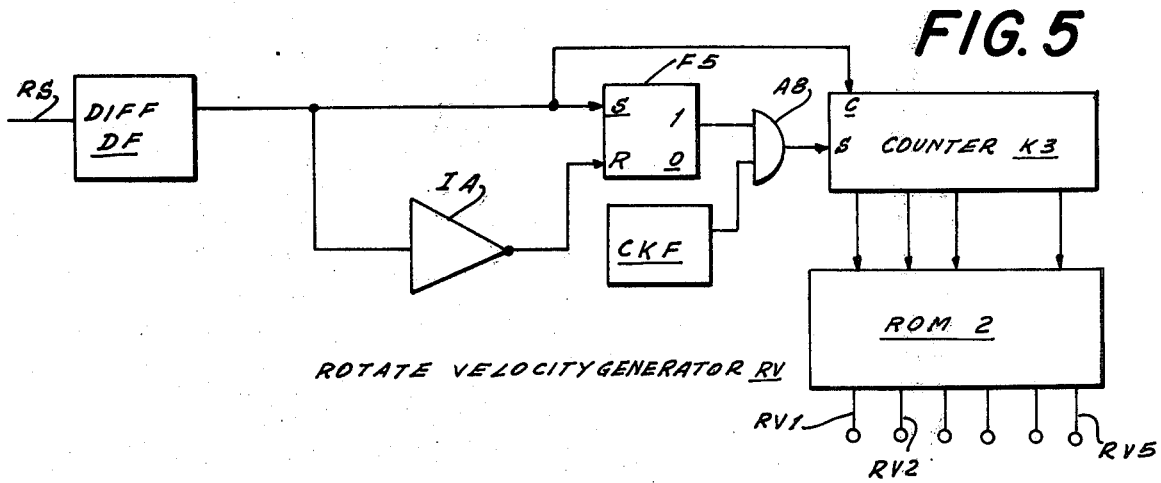
FIG. 5 is a logic diagram of the rotate velocity generator RV of FIG. 2.

Rotate velocity generator RV shown in FIG. 5 receives each of the pulses on line RS from transducer 44 (FIG. 1) at the input of differentiator DF which, assuming positive going pulses, emits a positive going spike at the leading edge of the pulse and negative going spike at the trailing edge of the pulse. The positive going spike is fed directly to the input of flip-flop F5 whose output-1 is connected to one input of two-input AND-gate A8 whose second input is connected to clock CKF and whose output is connected to the count input S of counter K3. The output of differentiator DF is also connected to the clear or initializing input C of counter K3 and via inverting amplifier IA to the restore input of flip-flop F5.

Thus, at the leading edge of a pulse receive from line RS, the counter K3 starts counting high speed clock pulses and at the trailing edge stops counting and retains the count until the leading edge of the next pulse on line RS. Now it should be realized that the time between the leading and trailing edges of the pulses is a function of the angular velocity of the shaft. It should also be realized that the count stored in the counter is also a function of the angular velocity of the shaft. The count in the counter is used as an address to select registers in a read only memory ROM2 wherein each register stores a binary number representing a specific velocity. Thus by initially loading into the registers of the memory these specific values and correlating the addresses of the registers to the counts in the counter, velocity values are transmitted from the output of memory ROM2 to cable RV1-5.

Note tilt velocity generator TV is the same as rotate velocity generator RV except for a different clock frequency and different velocity values in its memory.

Figure 6:
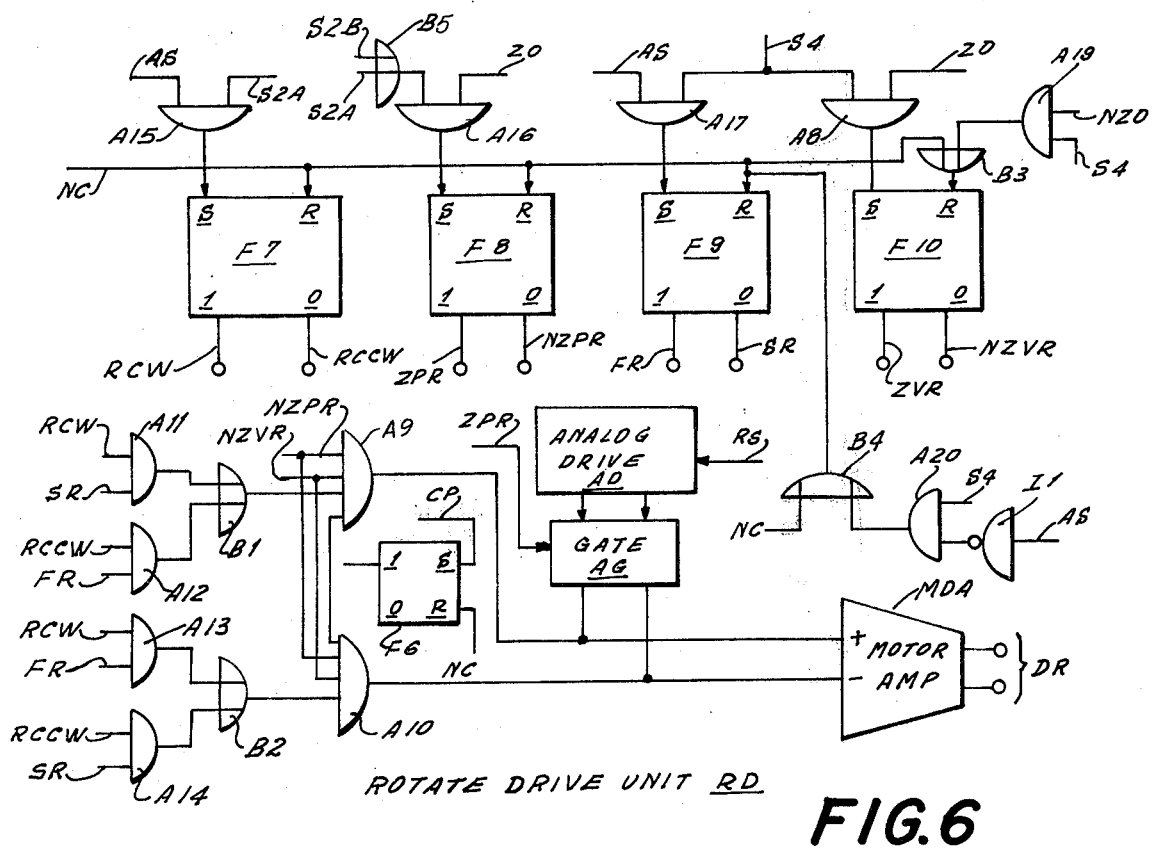
FIG. 6 is a logic diagram of the rotate drive unit of FIG. 2.

The rotate drive unit RD shown in FIG. 6 centers around motor amplifier MDA whose output is connected via lines DR to rotate motor 42. For the sake of definiteness it will be assumed that if a signal is on the (+) input to the motor amplifier it transmits current which will try to drive the motor in a clockwise direction and if a signal is on the (−) input of the amplifier it transmits a current which will try to drive the motor in a counter-clockwise direction. Signals to the (+) input are controlled by AND-gate A9 and signals to the (−) gate are controlled by AND-gate A10.

Each of the AND-gates has an input connected to the output of flip-flop F6 which is set by a signal on line CP connected to its set input S and is restored by a signal on line NC connected to its restore input R for insuring that the motor amplifier will only receive signals when a character is being processed. Each of the AND-gates also has an input connected to line NZVR. A signal on this line indicates that there is difference between the actual and desired velocity and that therefore the shaft velocity should be changed. An input of each of the AND-gates 9 and 10 is connected to line NZPR. A signal on this line indicates that the shaft has not yet reached the range of the desired position and hence should still be digitally driven.

The fourth input of AND-gate A9 is connected to the output of OR-circuit B1 whose inputs are connected to the outputs of AND-gates A11 and A12. AND-gate A11 has inputs connected to lines RCW and SR. A signal on line RCW indicates that the actual position of the shaft is counter-clockwise of the desired position of the shaft and a signal on line SR indicates the shaft is moving at less than the desired velocity. AND-gate A12 has inputs connected to lines RCCW and FR. A signal on line RCCW indicates that the actual position of the shaft is clockwise of the desired position and a signal on line FR indicates that the shaft is moving faster than the desired velocity.

The fourth input of AND-gate A10 is connected to the output or OR-circuit B2 whose inputs are connected to the outputs of AND-gate A13 and A14. AND-gate A13 has inputs connected to lines RCW and FR. AND-gate A14 has inputs connected to lines RCCW and SR. Connected in parallel to motor amplifier MDA is analog gate AG which is controlled by a signal on line ZPR to pass signals from analog drive AD. The analog drive which forms no part of the invention processes the signals on lines RS to generate analog signals used only during the final homing of the shaft.

Included in rotate drive unit RD are four flip-flops F7 to F10. Each of the flip-flops is restored to an initial state at the end of character processing in response to a signal on line NC. Flip-flop F7 whose set input S is connected to the output of AND-gate A15 which receives signals from lines AS and S2A. In state S2A the sign output AS of arithemetic unit AU is sampled. If a signal is present on line AS at that time it sets the flip-flop F7 resulting in the generation of a signal on line RCW. If no signal is present of line AS at that time flip-flop F7 remains cleared and a signal is present on line RCCW. In this way flip-flop F7 indicates whether the shaft should rotate clockwise or counter-clockwise.

The set input S of flip-flop F8 is connected to the output of AND-circuit A16 which is connected to line ZO and the output of OR-circuit B4 to sample if there is a difference between the desired and actual position values. If there is no difference a signal will be present on line ZO during state 2 causing the setting of the flip-flop and the generation of a signal on line ZPR. If there is a difference the flip-flop F8 will remain cleared and generating a signal on line NZPR.

The set input of flip-flop F9 is connected to the output of AND-gate A17 whose inputs are connected to lines AS and S4 to sample whether or not the desired velocity is greater than the actual velocity. If the desired velocity is greater, a signal will be present on line AS during state 4 setting flip-flop F9 which generates a signal on line FR. Otherwise, the flip-flop F9 is cleared and generating a signal on line SR by virtue of the signals at AND-gate A20 whose output is connected via OR-circuit B4 to the clear input thereof.

The set input S of flip-flop F10 is connected to the output of AND-gate A8 whose inputs are connected to lines S4 and ZO to sample whether there is a difference between the desired and actual velocities. If there is no difference a signal will be present on line ZO during state 4 causing the setting of flip-flop F10 and the generation of a signal on line ZVR. If there is a difference the signal on line NZO will pass via AND-gate A19 during the presence of a signal on line S4 connected to the other input thereof and via OR-circuit B3 to clear the flip-flop F10 which then generates a signal on line NZVR.

Basically in operation, when a character is first received, assuming it is at a different position, it is first determined whether the shaft is to rotate clockwise or counterclockwise. This information is then stored in flip-flop F7. Then as the shaft moves it is determined whether the shaft is moving faster or slower than desired, or as desired. The first determination is stored in flip-flop 9, the latter in flip-flop F10. If it is moving as desired AND-gates A9 and 10 are blocked by virtue of the absence of signal on line NZVR. If not, these gates are open and a constant amplitude signal fed to either the (+) or (−) input of motor amplifier MDA; which input receives the signal is determined by the states of flip-flop F7 and F9. When the actual position approaches the desired position flip-flop F8 is set, initiating a signal on line ZPR which opens gate AG and terminating a signal on line NZPR to block AND-gates A9 and A10. In this way the final movement of the shaft is switched from a digital to an analog control.

The multiplexer MUX1 can be a combination of AND-gates and OR-circuits which solve the following Boolean equations:

```
1M1 = (IB1 · S1) + (M1 · S3) +    (IB6 · S5) + (M1 · S7)
1M2 = (IB2 · S1) + (M2 · S3) +    (IB7 · S5) + (M2 · S7)
1M3 = (IB3 · S1) + (M3 · S3)                 + (M3 · S7)
1M4 = (IB4 · S1) + (M4 · S3)                 + (M4 · S7)
1M5 = (IB5 · S1) + (M5 · S3)                 + (M5 · S7)
```

The multiplexer MUX2 can be a logic array of AND-gates and OR-circuits satisfying the following Boolean equation:

```
2M1 = (RC1 · S1) + (RV1 · S3) +    (TC1 · S5) + (RV1 · S7)
2M2 = (RC2 · S1) + (RV2 · S3) +    (TC2 · S5) + (RV2 · S7)
2M3 = (RC3 · S1) + (RV3 · S3)                 + (RV3 · S7)
2M4 = (RC4 · S1) + (RV4 · S3)                 + (RV4 · S7)
2M5 = (RC5 · S1) + (RV5 · S3)                 + (RV5 · S7)
```

The multiplexer MUX3 can be a logic array of AND-gates and OR-circuits satisfying the following Boolean equation:

```
3M1  = [RR1  · (S2A+S2B)] + [TR1  · (S6A+S6B)]
3M2  = ][RR2 · (S2a+S2B)] + [TR2  · (S6A+S6B)]
3M3  = [RR3  · (S2A+S2B)] + [TR3  · (S6A+S6B)]
3M4  = [RR4  · (S2A+S2B)] + [TR4  · (S6A+S6B)]
3M5  = [RR5  · (S2A+S2B)] + [TR5  · (S6A+S6B)]
3M6  = [RR6  · (S2A+S2B)] + [TR6  · (S6A+S6B)]
3M7  = [RR7  · (S2A+S2B)] + [TR7  · (S6A+S6B)]
3M8  = [RR8  · (S2A+S2B)] + [TR8  · (S6A+S6B)]
3M9  = [RR9  · (S2A+S2B)] + [TR9  · (S6A+S6B)]
3M10 = [RR10 · (S2A+S2B)] + [TR10 · (S6A+S6B)]
```

In the above equation the (·) symbol indicates an AND-function which can be realized by an AND-gate and the (+) symbol indicates an OR-function which can be realized by an OR-circuit.

While only one embodiment has been shown and described in detail there will now be obvious to those skilled in the art many modifications and variations satisfying many or all of the objects of the invention but which do not depart from the spirit thereof as defined by the appended claims.

What is claimed is:

1. Apparatus for controlably rotating first and second shafts comprising: first and second motor means connected respectively to the first and second shafts, first and second transducer means connected to the first and second shafts, first indicator means connected to said first transducer means for generating a first actual position value representing the actual position of the first shaft, second indicator means connected to said second transducer means for generating a second actual position value representing the actual position of the second shaft, source means for generating first and second desired position values representing desired positions of the first and second shafts, respectfully, comparing means for comparing a desired position value and an actual position value to generate a quantity which is a function of the difference between said desired and actual position values, first drive means for converting a received first quantity to an electrical current for driving said first motor means, second drive means for converting a received second quantity to an electrical current for driving said second motor means, and switching means for periodically and alternately feeding a first actual position value and a first desired position value to said comparing means whereby a first quantity is generated for transfer to said first drive means and a second actual position value and a second desired position value to said comparing means whereby a second quantity is generated for transfer to said second drive means, the operation of said switching means being such that the feeding of said first position values is interleaved with the feeding of said second position values to that said first and second motor means are simultaneously energized.

2. The apparatus of claim 1 wherein said comparing means includes storage means for storing desired velocity values related to a desired shaft rotation velocity for each of the differences between a desired and an actual position valve, means for selecting the desired velocity value associated with the desired and actual position values being compared, and converting means for converting said desired velocity value to the quantity for transmission to one of said drive means.

3. The apparatus of claim 2 wherein said converting means comprises first and second velocity value generating means, connected to said first and second transducer means respectively, for generating first and second actual velocity values representing the actual rotational velocity of the first and second shafts, respectively, so that said converting means converts the desired velocity value to said quantity as a function of the actual velocity value.

4. The appartus of claim 1 wherein the first and second actual position values and the first and second desired position values are binary numbers and said comparing means includes a binary arithmetic unit.

5. The apparatus of claim 4 wherein said first and second transducer means include means for generating a pulse for each given increment of rotation of the first and second shafts, respectively, and wherein said first and second indicator means include binary pulse counters.

6. The apparatus of claim 4 wherein said comparing means includes storage means having a plurality of addressable registers for storing desired velocity values related to a desired shaft rotation velocity for each of the differences between a desired and an actual position value, each of said desired velocity values being stored in a register of said storage means which has an address related to difference of the position values, said binary arithmetic unit including means for performing subtractions between received desired and actual values, means for transmitting received and desired position values to said binary arithmetic unit for obtaining the addresses of the associated addressible registers of said storage means to fetch the desired velocity values stored therein and converting means for converting said desired velocity values to the quantities for transmission to said drive means.

7. The apparatus of claim 6 wherein said desired velocity values are binary numbers and said converting means comprises first and second velocity value generating means connected to said first and second transducer means, respectively, for generating first and second actual velocity values in the form of binary numbers representing the actual rotational velocity of the first and second shafts, respectively, means for transmitting said actual and a desired velocity value to said binary arithmetic unit for performing subtractions between received actual and desired velocity values, and means utilizing the results of the subtractions for generating said first and second quantities.

8. Apparatus for controllably rotating a shaft comprising transducer means connected to said shaft, first indicator means connected to said transducer means for generating an actual position valve representing the actual position of the shaft, source means for generating a desired position value representing the desired position of the shaft, comparing means receiving the desired and actual position values for comparing said desired position value and said actual position value to generate an address value, storage means having a plurality of addressable registers each storing desired velocity information related to a desired velocity for driving the shaft in view of the displacement between the desired and actual positions of the shaft, fetching means utilizing the generated address value to fetch the contents of the corresponding addressed register, converting means for converting the contents of said corresponding addressed register to an electrical drive signal, and motor means connected to said converting means for receiving the electrical drive signal for rotating the shaft.

9. The apparatus of claim 8 wherein said actual and desired position values are expressed as binary numbers and said desired velocity information is also expressed as binary numbers, and said comparing means comprises a binary arithemetic unit for calculation of the numerical difference between the binary numbers representing two values.

10. The apparatus of claim 9 wherein said converting means includes generating means for geneating an actual velocity value, expressed as a binary number, related to the actual velocity of the shaft, means for transmitting the actual velocity value and the desired velocity information to said binary arithmetic unit and means for generating the electrical drive signal in accordance with the difference calculated by said binary arithmetic unit.

11. The apparatus of claim 10 wherein the plurality of registers of said storage means are divided into a plurality of sets, each of said sets being associated with the difference between the desired position value and the initial actual position value, a first register of each set storing a value of velocity information related to the velocity desired when the shaft is at the initial actual position when movement of the shaft is desired and the remaining registers of each set storing values of velocity information related to the velocity desired for subsequent actual positions of the shaft during the movement from the initial position to the desired position.

12. The apparatus of claim 11 whrein said fetching means includes means for selecting the first register of a set by using the initial address value related to the difference between the initial actual position and desired position of the shaft and for selecting a subsequent register of said set by using said initial address value as well as an address value related to the difference between a subsequent actual position and the desired position of the shaft.

13. The apparatus of claim 11 wherein said transducer means includes means for generating a position pulse for each given increment of rotation of the shaft and wherein said converter means includes a surface of timing pulses having a repetition rate which is faster than the rate of generation of the position pulses, means for controlling said counter to count the number of timing pulses occurring during the presence of the position pulse, and means for encoding the count accumulated by said counter into an actual velocity value.

* * * * *